United States Patent
Dalén

(10) Patent No.: US 7,491,183 B2
(45) Date of Patent: Feb. 17, 2009

(54) PLAYING RACK HAVING VIBRATING PLATFORM TO STAND ON

(75) Inventor: Ylva Dalén, Lidingö (SE)

(73) Assignee: Jump & Joy AB, Nacka (SE)

( * ) Notice: Subject to any disclaimer, the term of this patent is extended or adjusted under 35 U.S.C. 154(b) by 158 days.

(21) Appl. No.: 10/554,764

(22) PCT Filed: Apr. 29, 2004

(86) PCT No.: PCT/SE2004/000667

§ 371 (c)(1), (2), (4) Date: Dec. 19, 2005

(87) PCT Pub. No.: WO2004/096112

PCT Pub. Date: Nov. 11, 2004

(65) Prior Publication Data

US 2006/0281602 A1    Dec. 14, 2006

(30) Foreign Application Priority Data

Apr. 29, 2003    (SE) .................................... 0301250

(51) Int. Cl.
*A61H 1/00* (2006.01)
*A61H 23/00* (2006.01)

(52) U.S. Cl. .............................. 601/46; 601/47; 601/49; 601/61

(58) Field of Classification Search .................. 601/23, 601/26, 27, 29, 30, 31, 46, 49, 66, 75, 84, 601/88, 89, 90, 93, 96, 98, 101, 105
See application file for complete search history.

(56) References Cited

U.S. PATENT DOCUMENTS 2,174,648  A    10/1939  Solinski (Continued)

FOREIGN PATENT DOCUMENTS

SE    523460 C2    4/2004

(Continued)

OTHER PUBLICATIONS

International Search Report for PCT/SE2004/000667, mailed Jul. 31, 2004.

(Continued)

*Primary Examiner*—Danton DeMille
(74) *Attorney, Agent, or Firm*—Potomac Patent Group PLLC

(57) ABSTRACT

A playing rack intended for stimulating children having functional disorders includes a base and a platform, on which a child can stand, holding onto and/or be held by a holding device, e.g., a hand railing. An intermediate plate is mounted between the base and platform to give the platform a limited movability. To achieve a stimulation of the growth of the child's skeletal structure the platform can be vibrated by vibrators. To stimulate the child's motor function and give a positive playing experience the platform can be given other movements. Thus, fluid operated bellows can raise, lower and tilt the platform. Motors attached between the base, the intermediate plate and the platform can displace the platform in a controlled way in various ways, e.g., rotating it. Inputs are mounted at the railing to be operated by the child, giving signals to a computer connected to the vibrators and motors to make the platform vibrate and perform other movements as controlled by the child's input. The child can watch a display and hear sound from a loudspeaker. The computer can then make the platform move according to the pictures shown and/or the sound.

14 Claims, 4 Drawing Sheets

U.S. PATENT DOCUMENTS

| | | | |
|---|---|---|---|
| 4,418,911 A | | 12/1983 | Bowers et al. |
| 5,046,484 A | * | 9/1991 | Bassett et al. .................. 601/24 |
| 5,112,045 A | | 5/1992 | Mason et al. |
| 5,466,213 A | * | 11/1995 | Hogan et al. .................. 601/33 |
| 5,649,865 A | * | 7/1997 | Harvey ......................... 482/71 |
| 6,290,661 B1 | * | 9/2001 | Cutler et al. .................. 601/49 |
| 6,620,117 B1 | * | 9/2003 | Johnson et al. ............... 601/90 |
| 2002/0094867 A1 | | 7/2002 | Kanno et al. |

FOREIGN PATENT DOCUMENTS

| | | |
|---|---|---|
| SE | 523920 C2 | 6/2004 |
| WO | WO 02/053084 A1 | 7/2002 |

OTHER PUBLICATIONS

Written Opinion for PCT/SE2004/000667, mailed Jul. 31, 2004.

Jankovich, John P., "The Effects of Mechanical Vibration on Bone Development in the Rat," J. Biomechanics, 1972, vol. 5, pp. 241-250.

Rubin, Clinton T., et al., "The Cellular Basis of Wolff's Law—Transduction of Physical Stimuli to Skeletal Adaptation," Orthopedic Surgery and Degenerative Arthritis, Rheumatic Disease Clinics of North America, vol. 14, No. 3, Dec. 1988, pp. 503-517.

Rubin, Clinton T., et al., "Osteoregulatory Nature of Mechanical Stimuli: Function as a Determinant for Adaptive Remodeling in Bone," Journal of Orthopaedic Research, vol. 5, No. 2, 1987, pp. 300-310.

Ward, Kate, et al., "Low Magnitude Mechanical Loading is Osteogenic in Children with Disabling Conditions," Journal of Bone and Mineral Research, vol. 19, No. 3, 2004, pp. 360-369.

Konieczynski, D. D., "Evaluation of a Bone's In Vivo 24-hour Loading History for Physical Exercise Compared with Background Loading," Journal of Orthopaedic Research, vol. 16, No. 1, 1998, pp. 29-36.

Knothe Tate, Melissa L., et al., "Experimental Elucidation of Mechanical Load-Induced Fluid Flow and Its Potential Role in Bone Metabolism and Functional Adaptation," The American Journal of the Medical Sciences, vol. 316, No. 3, Sep. 1998, pp. 189-195.

"Purr Like a Cat—and Prevent Osteoporosis," The Journal of the Swedish Medical Association (Läkartidningen), vol. 100, No. 45, 2003, pp. 1-6.

* cited by examiner

PLAYING RACK HAVING VIBRATING PLATFORM TO STAND ON

RELATED APPLICATION

This application claims priority and benefit from Swedish patent application No. 0301250-7, filed Apr. 29, 2003, the entire teachings of which are incorporated herein by reference. This application also claims priority from PCT/SE2004/000667, the disclosure of which is incorporated here by reference.

TECHNICAL FIELD

The present invention relates to a playing rack for patients, in particularly children, having a reduced functional ability, in particularly a reduced ability to move, and more particularly children having severe neurological damages including or not including retardation.

BACKGROUND

Children having severe functional disorders have a difficulty in making pleasant movements in or of their own body. Movements which are pushing or shearing directed towards gravity affect the building-up or development of the skeletal structure of human beings and animals. Generally, children having severe dysfunctions have not themselves the capability of providing such dynamical loads. The lack of such movements contributes to skeleton brittleness of such children, see Konieczinski, D. D., Truty, M. J., Biewener, A. A.: "Evaluation of a bone's in vivo 24-hour loading history for physical exercise compared with background loading", J. Orthop. Res., 1998:16, pps. 29-37, and Knothe Tate, M. L., Knothe, U., Niederer, P.: "Experimental elucidation of mechanical load induced fluid flow and its potential role in bone metabolism and functional adaptation", Am. J. Med. Sci., 1998:316, pps. 189-195. Children having these kind of damages also generally often have an increased general level of muscular tensions, i.e. a high spasticity which can result in muscles pulling joints out of correct positions. The hip joint is worst affected thereby. Hip joint luxation is a painful condition. Preventive medical treatment including frequent injections of the nerve poison Botox and surgical operations to prolong muscles and sinews must be used for children that can have by joint luxations.

Vibrations and other dynamic loads on the skeleton have in animal tests appeared to have a large effect on the building-up of the skeletal structure, see Jankovics, John: "The effects of mechanical vibration on bone development in the rat", J. Biomechanics, 1997:5, pps. 241-150, Rubin, C. T., Hausman, M. R.: "The cellular basis of Wolffs's law", Rheumatic Disease clinics of North America, 1988:14, pps. 503-517, and Rubin, C. T., Lanyon, L. E.: "Osteoregulatory nature of mechanical stimuli: Function as determinant for adaptive remodeling in bone", J. Orthop. Res., 1987:5, pps. 300-310. In a small study of children having cerebral paresis an increase of their skeleton mass when exposed to vibrations has been demonstrated, see Ward, K. A., Alsop, A. W., Brown, J., Caoulton, J. E., Adams, M. Z., Mughal, M. Z.: "The effects of low magnitude, high frequency loading treatment on volumetric trabecular bone mineral density of children with disabling conditions", Times Newspaper LTD, 4 Jul. 2002. Physiotherapist have in clinical practice used movements and local vibrations to achieve a reduction of spasticity. Thus, in the best cases it is possible to obtain both an increased skeleton mass and a reduced spasticity, in the same time as the children themselves have fun.

Generally all children, also children having a severely reduced functional ability, have a need to feel that they can affect their situation and to feel the happiness of movement.

In Läkartidningen, February 2003, an apparatus has been described that allows that "children having severe neurological damages can themselves jump, dance and rotate". The apparatus acts by "hanging the child in a standing shell, a moulded plastic shell, in a rack including an instrument panel. The child is allowed to choose the music and can then himself/herself control and determine if he or she wants to jump, rotate, elevate or lower himself/herself in the same rhythm as the music—thus to dance". Since such children often has skeleton brittleness, an advantage associated with the apparatus is said to be that when children "move against the gravity, it affects the skeleton and they obtain stronger skeletons". Furthermore, it is said, as to the use of the apparatus for children having severe neurological damages: "By the fact that they can affect their situation—they can choose what they want to do and they can rotate and see what happens in the room —also their mental development is stimulated".

In U.S. Pat. No. 4,418,911 a swingable platform for videogames is disclosed that is driven by a motor and is suspended in a surrounding support. In the published U.S. patent application 2002/0094867 a board, of the type skateboard, is disclosed which through a plurality of intermediate parts is movably attached to a base plate. The movement of the board is detected in order to show image sequences corresponding to the detected movements. In U.S. Pat. No. 5,112,045 a device for kinesthetic diagnosis and rehabilitation is disclosed that includes a rigid plate mounted to an inflatable toroidal element, in which the pressure can be controlled by a patient who is standing on the plate. The plate cannot be controlled to provide different movements but only a very limited setting in the vertical direction and different degrees of elasticity in relation to the base. In International patent application WO 02/053084 a device for vibration stimulation of the human body is disclosed that includes a vibrating platform having support handles. Such a platform can perform only a very limited movement in relation to the base.

SUMMARY OF THE INVENTION

It is an object of the invention to provide a playing rack for stimulating patients and children having a reduced functional ability, in particularly for facilitating and stimulating the building-up or development of the skeleton of such patients/children and for stimulating their motor system.

It is another object of the invention to provide a playing rack for patients and children having a reduced functional ability to give such patients/children positive movement experiences.

It is another object of the invention to provide a playing rack for patients and children having a reduced functional ability that has a simple structure in order to allow that such patients/children are stimulated by a plurality of different movements.

Generally a playing rack for patients/children includes a base and a platform connected thereto. The connection between the base and the platform is such that it allows at least a limited movability between the base and the platform. The platform includes advantageously a holding device in order that patients/children will be able to stand on the platform and hold onto and/or be held by the holding device. The holding device is preferably rigidly attached to the platform so that the holding device and the platform move as one unit.

In order to allow and increase in a simple way the movability between the base and the platform preferably an intermediate plate can be connected to both the base and to the platform so that the intermediate plate itself is movable in relation to both the base and the platform.

In order to achieve stimulation of a patient/child standing on a platform an independently working drive element such as a vibration device including at least one vibrator can be coupled to the platform to give it a vibration movement. Furthermore, an inflatable unit such as a bellows unit coupled to the platform can be provided to achieve in a simple way an elevation/lowering of the platform and/or a tilting movement thereof. The bellows unit can include at least two separate bellows devices and they can then act between the intermediate plate and the platform.

Generally thus, motors or other drive elements can be connected between the base and the platform and in particularly between the intermediate plate and the base and between the intermediate plate and the platform to move, in the general case, in a controlled way the base and the platform in relation to each other and in the special case move, in a controlled way, the intermediate plate and the base in relation to each other and the intermediate plate and the platform in relation to each other.

Operating means can be provided, for example at the holding device. They can then be influenced by a child standing on the platform and can provide signals to a computer connected to the operating means and to the vibrator and to the motors to make the platform vibrate and perform other movements, respectively, as controlled by manual input to the operating means.

A display can be mounted so that it can be watched by a child standing on the platform and/or a loudspeaker can provided to emit sound that can be heard by the child. A computer can be coupled to the display and to the loudspeaker respectively and to the vibrator and the motors to make the platform vibrate or to move in another way, respectively, according to images shown on the display and/or according to sound such as music that is output from the loudspeaker.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 4:
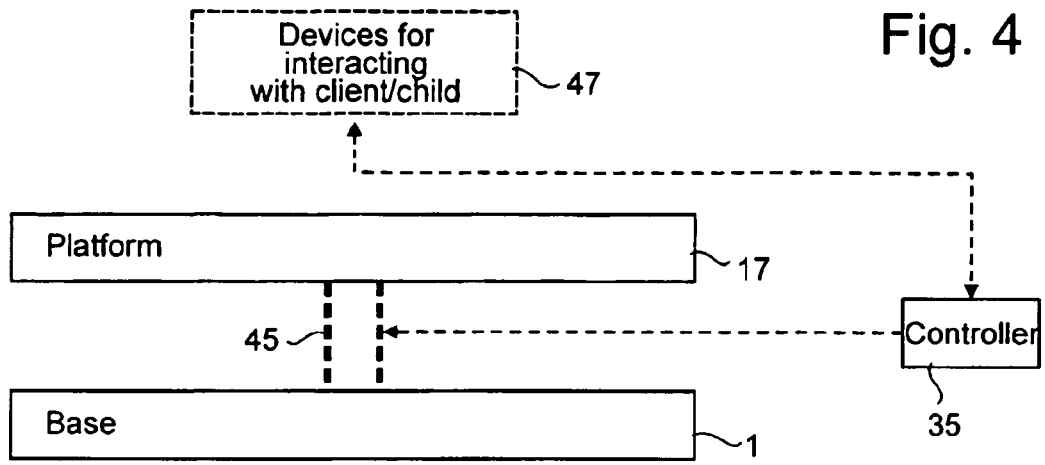
FIG. 4 is a very schematic picture of a stimulating rack.

In FIG. 4 a rack is schematically shown that is intended for stimulating a patient or a child. The rack includes a base 1 and a rigid platform 17 on which the patient or child respectively is intended to be standing. The base 1 and the platform 17 are by some device 45 mechanically connected to each other, such as by mechanical guides, drive elements, etc., not shown in this figure, to allow that the platform moves in relation to the base. The mechanical connection can be controlled by a controller or a computer 35. The patient/child can possibly interact with a playing rack through devices 47 that can include various kinds of input units and units to provide stimuli that can be experienced using the sight or hearing ability and that also are coupled to the controller.

Figure 5:
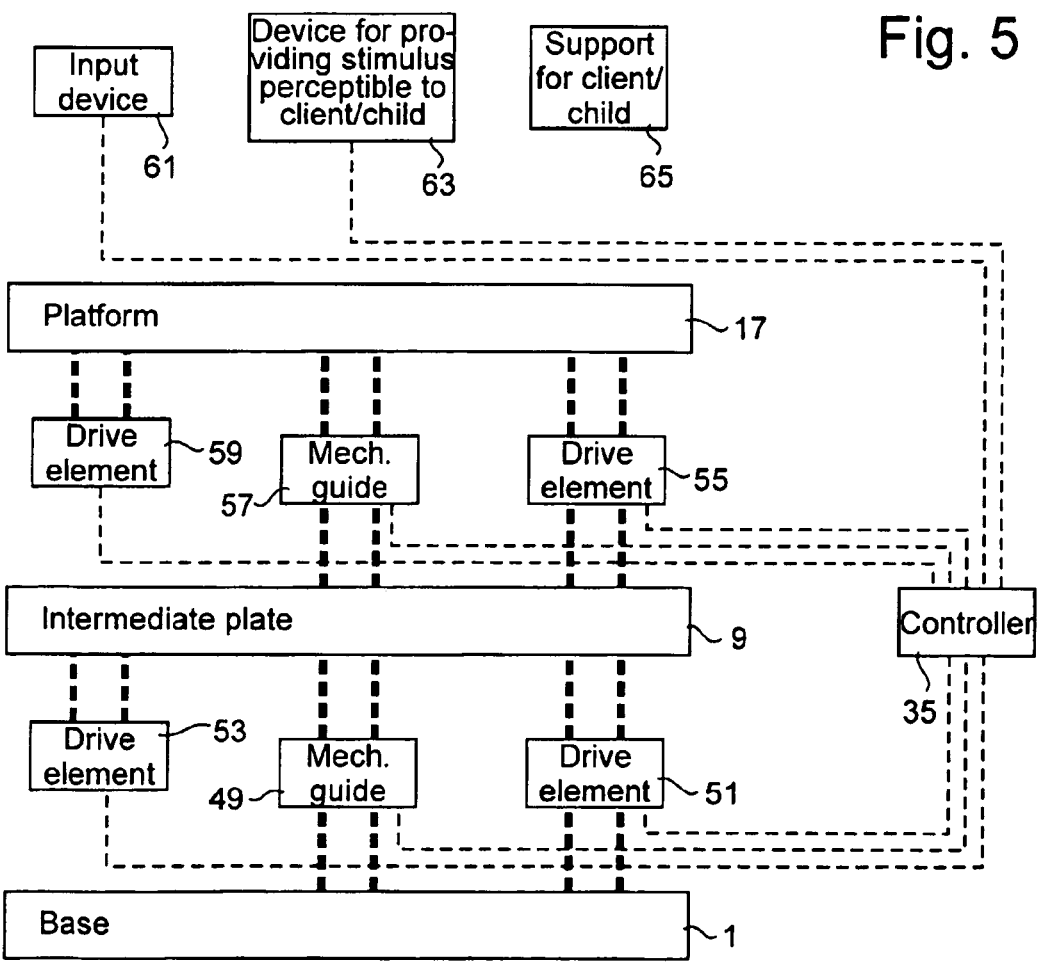
FIG. 5 is somewhat more detailed picture of a stimulating rack.

The schematic picture of FIG. 5 shows more details of the playing rack. Thus, a stiff intermediate plate 9 is mounted between the base 1 and the platform 17 to allow in a simple way a larger movability between the base and the platform. The platform and the intermediate plate are in the start position, in an immovable state without any activation, substantially parallel to each other and to the upper surface of the base. The intermediate plate is mechanically connected to the base 1 through a mechanically guide 49 and through intermediate drive elements 51. The latter ones can when activated make the intermediate plate move in relation to the base. The mechanical guide and the intermediate drive element can be combined in a single device. The intermediate plate 9 can also be made to move by an independently working drive element 53, for example a vibrator. The platform 17 is in a similar way connected to the intermediate plate 9 through a mechanical guide 55 and through intermediate drive elements 57. The platform can also be made to move by an independently working or acting drive element 59. Furthermore, the playing rack also includes an input unit 61, a unit 63 to provide signals or stimuli that can be experienced by a patient or child standing on the platform and a support device 65 for supporting the patient/child when she or he is standing on the platform. The controller 35 is coupled to the various drive elements and to the input unit and the signal emitting device.

Figure 1:
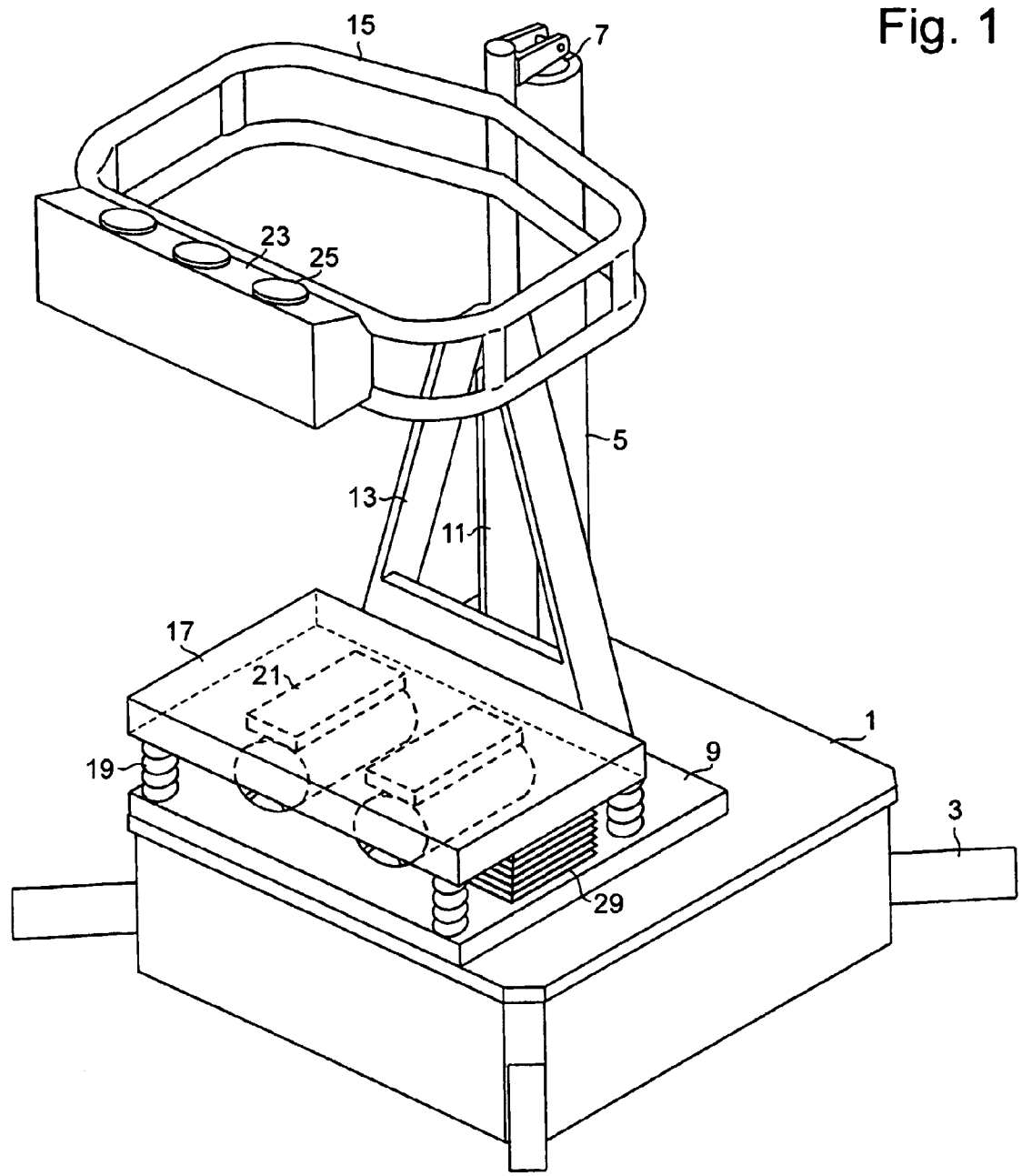
FIG. 1 is a perspective view of a playing rack for children having serious neurological damages.
Figure 2:
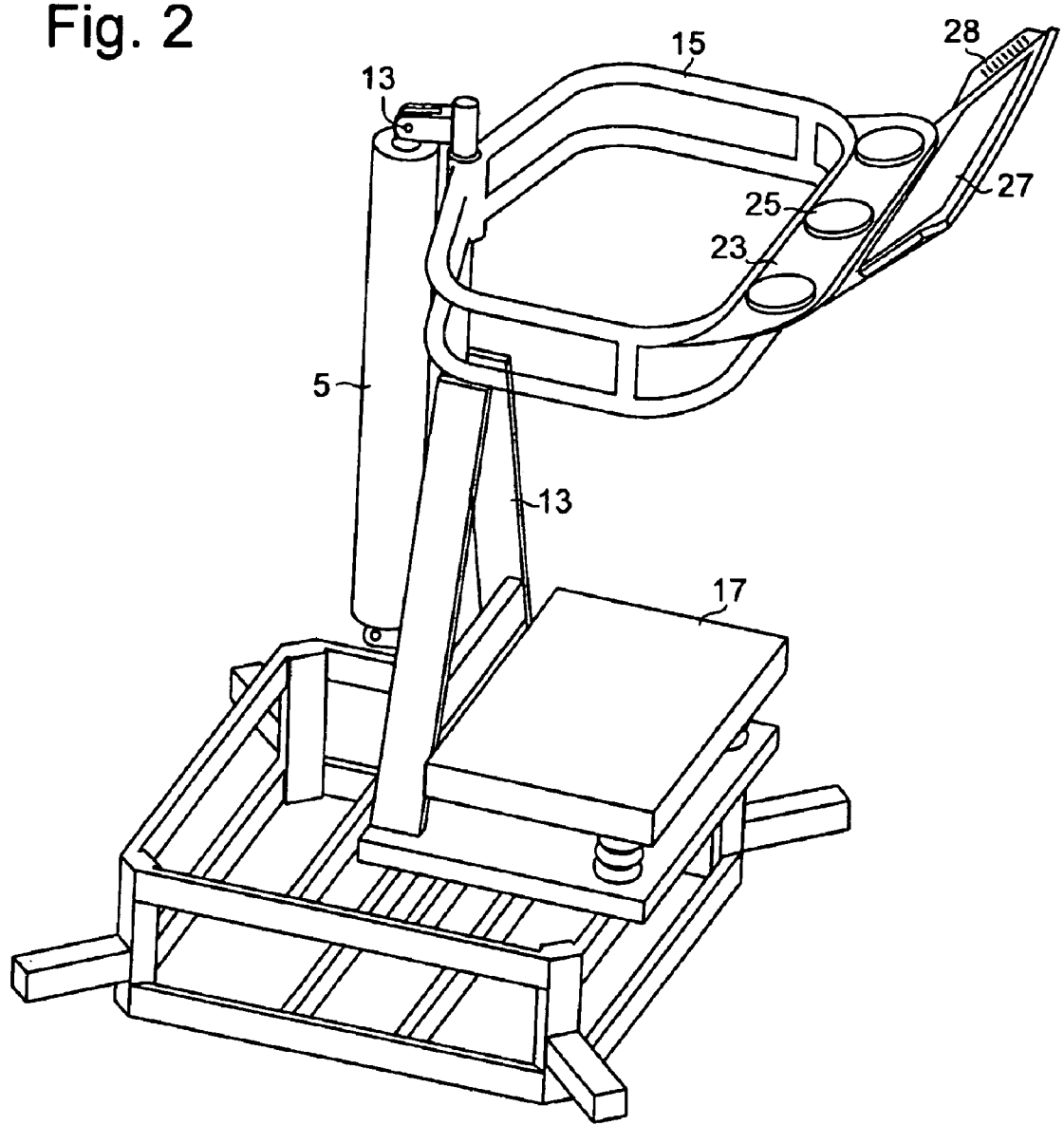
FIG. 2 is a perspective view of a playing rack similar to that of FIG. 1 seen from another direction.

In FIG. 1, see also FIG. 2, an embodiment of a playing rack intended primarily for children having more or less severe functional disorders, for example due to neurological damages, is illustrated in detail. The playing rack includes a base or a bottom plate 1 that can have substantially the shape of a rectangular block and have legs 3 that can be mounted for example at the corners and can be folded out, to provide an increased stability. A pillar 5 vertically standing up from the bottom plate 1 includes a linear motor for acting on an operating rod 7 that is movable in the pillar and can be controlled to move upwards and downwards therein. To the operating rod, in the embodiment shown, a movable plate 9 is attached through a vertical rod 11, that is mounted to slide at the pillar, and two oblique struts 13, at the edge of the plate that is located adjacent to the pillar. The oblique struts are at their upper ends attached to the sliding rod 11. To this rod also a holding device is mounted onto which a child can hold itself or by which he/she can be held. In the embodiment shown this holding device includes a hand railing 15 having the shape of horizontal frame that surrounds a child and thus, as seen from above, encloses the central portion of the plate 9. The holding device can when it is to be used for a child that cannot hold itself up right by itself also include a standing shell of some known kind, not shown. The frame 15 is placed in a settable, suitable height above a platform 17. In the use of the rack, a child is standing on the top surface of the platform that is configured as a plate located above and parallel to the plate 9.

The platform is connected to the plate 9 so that it has a limited movability in relation thereto. In the embodiment shown the connection includes four compression springs 19 attached to the corners of the platform and the plate.

To the bottom surface of the platform 17 two vibrators 21 are attached which when they are activated gives the platform a vibratory movement. This vibrating movement can have components for example in a single vertical plane that can then be located at a distance of the pillar 5 and for example pass centrally through the platform. The vibrators can be of some known type including eccentrically mounted rotating weights.

At the front side of the frame 15, at the portion thereof that is located at a distance of the rod 11, an operating panel 23 can be provided including input means, such as large keys which react when they are depressed. Other suitable operating means can include one or more joysticks.

Figure 3:
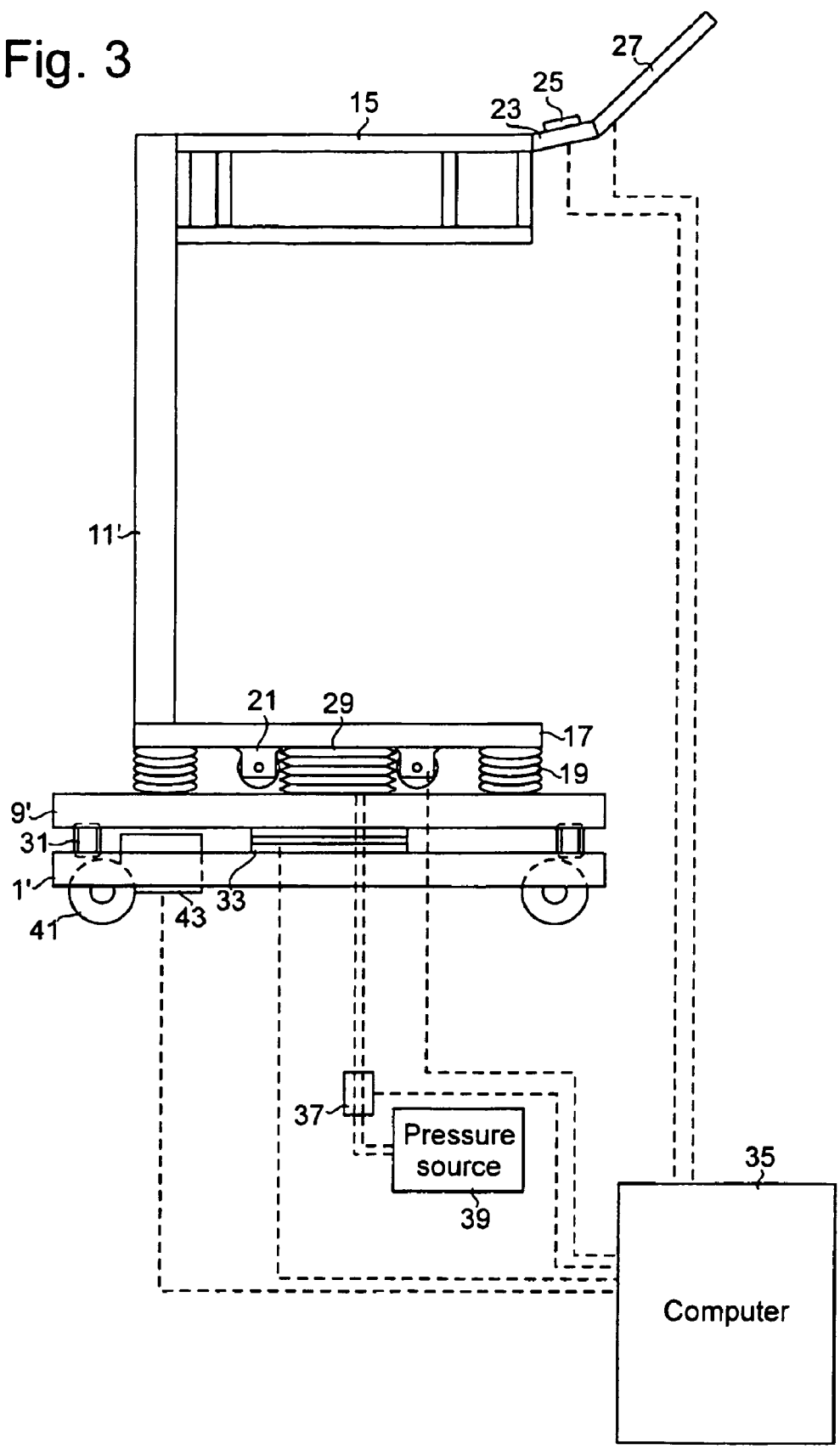
FIG. 3 is an elevational view of an alternative embodiment of a playing rack.

Furthermore, some displaying means such as a computer monitor 27 can be provided, see FIGS. 2 and 3. The monitor is placed on some suitable place so that it can be watched by a child standing on the platform 15. For example, it can be attached to the frame 15 or the operating panel 23 but it can also be freely standing. The monitor 27 can also include loudspeakers 28.

The function of the playing rack will now be described. The child is standing on the platform 17 and holds onto the frame 15 and is possibly also clamped to a standing shell. The child can now herself/himself, by influencing the operating means, make movements of the platform that are transferred to the child's body. The different motors that are included in the playing rack, including a motor for elevating and lowering the platform and vibrator motors in this embodiment, are connected to a computer, see FIG. 3, in which a suitable program is run or executed. When executing the program movable pictures can be shown on the monitor and/or music can be played and the platform 17 be given movements according to the images or the music, respectively, in order to elevate/lower the platform, i.e. displace the platform relatively slowly vertically generate a jump, i.e. displace the platform relatively quickly upwards give the platform a vibratory movement having a variable frequency In the case of music played then a kind of dancing movements can be activated in the child.

The child can be given a possibility to choose, by influencing the operating panel, whether the movements are to be synchronized with moving pictures shown and/or with music played the sequence of images displayed the music played to active itself movements of the platform, i.e. elevating/lowering, jumping and vibration.

The platform can also be provided with means to give it a lateral tilt. Thus, in FIG. 1 an inflatable unit such as bellows devices 29 is shown which is mounted between the lower plate 9 that is movable in a vertical direction and the platform, at the edges thereof. The bellows are provided with a controlled fluid pressure from some pressure source, not shown, and the control can be accomplished using electrically operated valves controlled by the computer. If a higher pressure is applied to one of the bellows devices a tilting movement is obtained that can be within an angular range of 5° around the horizontal position. For a suitable dimensioning the bellows 29 can be replaced by the elastic action of the springs 19 so that they can be given a smaller size, be completely omitted or be replaced by simple mechanically linear guides, for example designed as some link structure.

Furthermore, the playing rack can, if desired, be provided with means to rotate the platform around a vertical axis. Such rotating means could then be mounted to the device for attaching the pillar 15 to the bottom plate 1 and be controlled by the computer.

A somewhat different embodiment of the playing rack is shown in FIG. 3. Here the plate 9' is mounted to be rotated at a fixed distance from the bottom plate 1', for example within a limited angular range of at most 30°. For this purpose, the plate can be mounted to the bottom plate centrally or at opposite paths using rolls or balls 31. A motor 33 can in any case be centrally mounted to provide a controlled turning movement. The platform 17 is in the same way as in the first embodiment connected to the plate 9' by springs 19 which can be omitted and be replaced by mechanical guides, and two bellows devices 29. Vibrators 21 are attached to the bottom surface of the platform. A rod 11' projects upwards from the platform and supports the hand railing 15 including the operating panel 23 and the monitor 27 as above.

The playing rack can also be provided with a propagation function so that a child which is standing on the platform 17 can, by influencing a suitable operating device, make the playing rack slowly drive. Alternatively this driving function can be coupled to pictures shown, music played as above, so that the playing rack can perform small movements forwards and backwards and possibly including some turning or swinging movement. As is seen in FIG. 3, the bottom plate 1' can for this purpose be provided with wheels 41 driven by a motor 43. The motor is electrically coupled to and controlled by the computer 35.

A computer 35 is coupled to the motor 33 for the rotating movement, to the vibrators 31, to valves 37 to provide the bellows devices 29 with fluid pressure from a pressure source 39 and to let fluid out of the bellows devices and finally to the operating panel 23 and the display 27.

In this embodiment the bellows devices 29 provide both the vertical movement of the platform 17 and the tilting thereof.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. A playing rack for patients comprising:

a base, a platform arranged so that a patient will be able to stand on the platform, a single intermediate plate mechanically attached to and located between the base and to the platform and allowing at least a limited movability both between the intermediate plate and the base and between the intermediate plate and the platform, the platform thereby being given an extended movability in relation to the base to give movement stimulation of a patient standing on the platform, and at least one drive element connected between the base and the intermediate plate, the drive element also connected to or including a motor, in order to displace or make the intermediate plate move in relation to the base when the motor is activated, and at least one drive element connected between the intermediate plate and the platform, the drive element also connected to or including a motor, in order to displace or make the platform move in relation to the intermediate plate when the motor is activated.

2. The playing rack of claim 1, further comprising a drive element only connected to the platform, in particularly a vibrator, to make the platform move, in particular vibrate, in relation to the base and the intermediate plate.

3. The playing rack of claim 1, further comprising an inflatable device connected to the platform, in particular a bellows device, for elevating/lowering the platform in relation to the intermediate plate.

4. The playing rack of claim 1, further comprising:
an operating device or input device to be influenced by a patient standing on the platform, and
a computer coupled to the operating device or the input device respectively and to the drive elements or the motors to make the platform move, controlled by inputs to the operating device or to the input device, respectively.

5. The playing rack of claim 1, further comprising:
a display mounted to be watched by a patient standing on the platform, and
a computer coupled to the display and to the drive elements or the motors to make the platform move according to pictures shown on the display.

6. The playing rack of claim 1, further comprising a holding device rigidly attached to the platform so that a patient standing can hold onto the holding device.

7. The playing rack of claim 1, further comprising a holding device rigidly attached to the platform so that a patient standing can be held by the holding device.

8. The playing rack of claim 2, wherein the drive element only connected to the platform includes a vibrator to make the platform vibrate in relation to the base and the intermediate plate.

9. The playing rack of claim 1, further comprising an inflatable device connected to the platform for tilting the platform in relation to the intermediate plate.

10. The playing rack of claim 9, wherein the inflatable device is arranged for tilting the platform laterally in relation to the intermediate plate.

11. The playing rack of claim 3, wherein the inflatable device includes a bellows device.

12. The playing rack of claim 9, wherein the inflatable device includes a bellows device.

13. The playing rack of claim 9, wherein the inflatable device includes at least two bellows devices.

14. The playing rack of claim 1, further comprising:
a loud speaker mounted to provide sound that can be heard by a patient standing on the platform, and
a computer coupled to the loud speaker and to the drive elements or the motors to make the platform move according to sound emitted by the loud speaker.

* * * * *